3,342,714
PHOTOCHEMICAL PRODUCTION OF
HYDROCARBYLSULFONATES
Clarence L. Furrow and Charles E. Stoops, Bartlesville, Okla., assignors to Phillips Petroleum Company, a corporation of Delaware
No Drawing. Filed Feb. 21, 1966, Ser. No. 528,837
10 Claims. (Cl. 204—162)

This application is a continuation-in-part of copending application Ser. No. 465,776, filed June 21, 1965, which in turn is a continuation-in-part application of Ser. No. 392,915, filed Aug. 28, 1964, both now abandoned.

This invention relates to a process for the production of hydrocarbylsulfonates including alkyl and cycloalkyl sulfonates. In another aspect, this invention relates to an improved process for the production of alkyl and cycloalkyl sulfonates by the reaction of an alkene, as defined herein, with a bisulfite employing electromagnetic radiant energy as an initiator and a ketone promoter.

Currently, considerable research effort is being expended on the synthesis of biodegradable detergents. A considerable proportion of this research effort has been devoted to the synthesis of alkylbenzene sulfonates wherein the substituent alkyl group has a straight chain. Other types of detergents are also being investigated. A type of detergent which has received considerable attention is the alkyl sulfonate. Several processes have been investigated for the synthesis of alkyl sulfonates, but most of these processes have been undesirable because of such difficulties as low yields and high cost of iniators.

Accordingly, it is an object of our invention to provide a process for the production of alkyl and cycloalkyl sulfonates.

Another object of our invention is to provide an improved process for the reaction of alkenes with an alkali metal bisulfite.

Another object of our invention is to provide an improved process utilizing electromagnetic radiant energy for the initiation of reactions of alkenes with bisulfite compounds.

Other objects, advantages and features of our invention will be readily apparent to those skilled in the art from the following description and the appended claims.

According to the invention set forth in the parent applications, alkyl sulfonates are prepared by the reaction of an alkene with a bisulfite of the formula $MHSO_3$ wherein M is selected from the group consisting of sodium, potassium, lithium, rubidium and cesium. The reaction is conducted in the presence of ultraviolet and/or visible light, a mixed solvent system comprising water and at least one polar organic solvent having a relatively low absorptivity for the electromagnetic radiant energy employed and in the presence of a ketone promoter.

According to the present invention, cycloalkyl sulfonates are prepared by the reaction of a cyclic olefin with a bisulfite, as defined herein, and in the presence of ultraviolet and/or visible light, a mixed solvent system comprising water and at least one polar organic solvent having a relatively low absorptivity for the electromagnetic radiant energy employed and in the presence of a ketone promoter.

As used in this application, the term hydrocarbylsulfonate includes alkyl sulfonates in which the alkyl group can contain cycloalkyl or aromatic radicals as substituents and cycloalkyl sulfonates in which the cycloalkyl group can contain alkyl or aromatic radicals as substituents.

Alkenes which are reacted with bisulfite according to the process of said parent applications will generally contain from about 6 to about 20 carbon atoms per molecule. While the process of this invention is suitable for the reaction of the bisulfite compounds with straight chain monoolefins, branched chain monoolefins and cyclic monoolefins, it is particularly applicable to the reaction of bisulfite compounds with straight chain olefins, preferably 1-olefins. As used herein, the term alkene or olefin includes acyclic and cyclic monoolefins, including alkyl, cycloalkyl and aryl substituted derivatives thereof having about 5 to about 20 carbon atoms. Mixtures of alkenes can be employed in the process of the invention. Some specific examples of olefins which can be reacted with bisulfite compounds according to the process of this invention include 1-pentene, 2-methyl-1-butene, 1-hexene, 2-heptene, 1-octene, 1-decene, 3-undecene, 1-dodecene, 1-eicosene, 4-methyl-1-pentene, 2-methyl-1-pentadecene, 4-ethyl-2-octadecene, cyclopentene, cyclohexene, 4-ethylcyclohexene, cyclooctene, cyclodecene, cyclododecene, cyclohexadecene, cycloeicosene, 4-cyclohexyl-1-butene, 3-phenyl-1-butene, 6-phenyl-1-hexene, 3-phenylcyclopentene, and the like.

The bisulfite employed in the process of our invention has a formula $MHSO_3$, wherein M is selected from the group consisting of sodium, potassium, lithium, rubidium and cesium. The concentration of the bisulfite compound in the reaction zone preferably is sufficient to provide from 1 to 1.5 mols of the bisulfite compound per mol of alkene feed to the reaction zone. It is within the scope of this invention to employ larger amounts of bisulfite compound, but these larger quantities will cause difficulty in separation of the product from the unreacted bisulfite compound. The bisulfite compound can be introduced directly into the reaction zone or it can be introduced into the reaction zone as a water solution of the bisulfite compound.

The reaction is conducted in the presence of a mixed solvent system comprising water and a polar organic solvent having a relatively low absorptivity for ultraviolet and/or visible light. The polar organic solvent/water volume ratio will generally range from about 0.1:1 to 2:1, while the quantity of water present in the reaction zone will generally range from 0.5 to about 10 grams of water per gram of bisulfite compound present.

Suitable polar organic solvents having a relatively low absorptivity for the electromagnetic radiant energy of this invention and which can be employed in the cosolvent system of our invention include alcohols, ethers, amines, nitriles and the like. Low absorptivity, as the term is herein employed, refers to the absorption of electromagnetic radiation by the polar organic solvent to such a limited degree so as to not prevent the initiation of the alkene-bisulfite reaction by the electromagnetic radiation. Specific examples of suitable polar organic solvents which can be employed in the process include methyl alcohol, ethyl alcohol, n-propyl alcohol, isopropyl alcohol, n-butyl alcohol, sec-butyl alcohol, isobutyl alcohol, t-butyl alcohol, n-amyl alcohol, diethyl ether, dioxane, tetrahydrofuran, trimethylamine, piperidine, and the like. t-Butyl alcohol is a preferred solvent.

The reaction is conducted in the presence of a ketone promoter represented by the formula

wherein R is at least one member selected from the group consisting of alkyl and cycloalkyl radicals, and combinations thereof such as alkylcycloalkyl and cycloalkylalkyl radicals, the number of carbon atoms in each R group being from 1 to 10, with the further provision that the two R groups together can represent an alkylene radical containing from 2 to 20 carbon atoms in a cycloalkanone. Thus, the ketone promoters of our invention contain a total of from 3 to 21 carbon atoms. Specific examples of ketone promoters which can be employed in the process of our invention are acetone, methyl ethyl ketone, diethyl ketone, propyl butyl ketone, dipentyl ketone, dioctyl ketone, didecyl ketone, methyl tert-butyl ketone, bis(3-methylpentyl) ketone, bis(2-ethylhexyl) ketone, dicyclohexyl ketone, bis(3-methylcyclopentyl) ketone, bis(cyclopentylmethyl) ketone, cyclopropanone, 2-methylcyclobutanone, cyclopentanone, cyclohexanone, 3-ethylcyclooctanone, cyclohexadecanone, cycloheneicosanone, and the like. The amount of ketone promoter present in the reaction zone can vary over a wide range, but will generally fall within the range of from 7.5 to 50 volume percent of the ketone promoter-polar organic solvent mixture.

The electromagnetic radiation comprising ultraviolet and/or visible light radiation and which is employed as the initiator in the process of this invention will have a wave length generally ranging from about 1,000 to 9,000 angstroms, preferably in the range of 2,000 to 4,000 angstroms. The radiation dose absorbed by the alkene-bisulfite mixture will generally be from 0.001 to 1.0 einsteins, preferably from 0.01 to 0.5 einsteins. Any suitable source of these forms of light radiation can be employed, including such sources as mercury vapor lamps, photo lamps, sun lamps, sun light, etc.

The reaction of the olefin and bisulfite compound is conducted at a temperature ranging from the freezing point of the reaction mixture to about 100° C., preferably from the freezing point of the reaction mixture to about 50° C. The pressure will generally be autogenous, will range from about atmospheric to about 500 p.s.i., depending upon the temperature, the reaction solvents, and the like. The time of reaction will generally range from a few minutes to 50 hours, or longer.

The reaction can be conducted either batch-wise or continuous, but it is preferred to operate batch-wise. The constituents in the reaction mixture can be introduced independently into the reaction zone or the various constituents can be premixed and introduced into the reaction zone as a mixture or mixtures.

Examples of hydrocarbylsulfonates which can be prepared in accordance with this invention include:

Lithium 1-pentanesulfonate
Sodium 2-methyl-1-butanesulfonate
Sodium 1-hexanesulfonate
Potassium 2-heptanesulfonate
Rubidium 1-octanesulfonate
Cesium 1-decanesulfonate
Lithium 3-undecanesulfonate
Sodium 1-dodecanesulfonate
Potassium 1-eicosanesulfonate
Sodium 4-methyl-1-pentanesulfonate
Potassium 2-methyl-1-pentadecanesulfonate
Lithium 4-ethyl-2-octadecanesulfonate
Lithium cyclopentanesulfonate
Sodium cyclohexanesulfonate
Potassium 4-ethylcyclohexanesulfonate
Rubidium cyclooctanesulfonate
Cesium cyclodecanesulfonate
Sodium cyclododecanesulfonate
Potassium cyclohexadecanesulfonate
Sodium cycloeicosanesulfonate
Potassium 4-cyclohexyl-1-butanesulfonate
Sodium 6-phenyl-1-hexanesulfonate and the like.

The alkyl and cycloalkyl sulfonates prepared by the process of this invention have wide utility, particularly in the detergent and wetting agent field. For example, the reaction of dodecene with sodium bisulfite according to the process of this invention produces sodium dodecyl sulfonate, an excellent detergent material.

After the reaction is complete, the reaction mixture can be subjected to an evaporation step wherein water, polar organic solvent and ketone promoter are separated from the product alkyl or cycloalkyl sulfonate. Alkyl and cycloalkyl sulfonate yields of at least 95 percent are obtainable by the inventive process. By "Yield," as the term is herein employed, is meant the weight percent of alkene feed charged to the reaction zone converted to the alkyl or cycloalkyl sulfonate.

The following specific examples are presented to illustrate the objects and advantages of our invention of employing a ketone promoter in the reaction of an alkene with a bisulfite compound in the presence of a mixed solvent system and electromagnetic radiant energy having a wave length in the range of 1,000 to 9,000 angstroms.

EXAMPLE I

A series of runs was carried out in which sodium bisulfite was reacted with 1-dodecene in the presence of water, ultraviolet light, and a cosolvent as indicated in the following Table I. The reaction was conducted in the presence or absence of one of the ketone promoters of our invention. Control runs utilizing various other carbonyl compounds were also conducted.

Each of the runs was conducted by charging 40.4 grams (0.24 mol) of 1-dodecene, 31.2 grams (0.3 mol) sodium bisulfite, 168. ml. water, and 168 ml. of tert-butyl alcohol or a total of 168 ml. of a promoter-tert-butyl alcohol mixture. The mixture was then irradiated in a Rayonet Photochemical Reactor at 33° C. for 4.5 hours. It was determined that the reaction mixture absorbed 0.0837 einstein.

At the end of the reaction period, the reaction mixture was analyzed for dodecyl sulfonate content by the methylene blue test method (ASTM D1681–59T) using cetyl trimethylammonium bromide as the titrant. The results of these runs are expressed below in Table I.

action flask and analyzed for dodecyl sulfonate content by ASTM Method D–1681–59T. The results of these runs are expressed below in Table III.

TABLE I

| Run No. | Cosolvent | Ml. Cosolvent | Promoter | Ml. Promoter | Vol. Percent Promoter in Promoter-Cosolvent | Weight Product Mixt., Grams | Wt. Percent Sodium Dodecyl Sulfonate in Reaction Mixt. | Calc. grams, Dodecyl Sulfonate | Yield Percent of Theory |
|---|---|---|---|---|---|---|---|---|---|
| 1 | t-BuOH | 142.8 | Me Et Ketone | 25.2 | 15 | 69.1 | 86.1 | 59.5 | 91.2 |
| 2 | t-BuOH | 142.8 | Diethyl Ketone | 25.2 | 15 | 62.7 | 80.5 | 50.5 | 77.3 |
| 3 | t-BuOH | 142.8 | Acetone | 25.2 | 15 | 64.9 | 76.9 | 49.9 | 76.4 |
| 4 | t-BuOH | 142.8 | MeCO-t-Bu | 25.2 | 15 | 61.0 | 78.0 | 47.6 | 72.9 |
| 5 | t-BuOH | 142.8 | (MeCO)$_2$ | 25.2 | 15 | 35.5 | 4.9 | 1.74 | 2.66 |
| 6 | t-BuOH | 142.8 | (MeCO)$_2$CH$_2$ | 25.2 | 15 | 24.3 | 2.7 | 0.66 | 1.0 |
| 7 | t-BuOH | 142.8 | (MeCO)$_2$O | 25.2 | 15 | 29.3 | 7.7 | 2.26 | 3.46 |
| 8 | t-BuOH | 142.8 | MeCOOH | 25.2 | 15 | 27.9 | 7.4 | 2.06 | 3.16 |
| 9 | t-BuOH | 142.8 | MeCOOMe | 25.2 | 15 | 29.7 | 18.6 | 5.53 | 8.5 |
| 10 | t-BuOH | 142.8 | CH$_3$—(CH$_2$)$_4$—CO[1] | 25.2 | 15 | 65.8 | 75.6 | 49.8 | 76.2 |
| 11 | t-BuOH | 159.6 | Acetaldehyde | 8.4 | 5 | 24.2 | 3.7 | 0.895 | 1.37 |
| 12 | t-BuOH | 142.8 | ⋯do⋯ | 25.2 | 15 | 27.9 | 2.8 | 0.773 | 1.18 |
| 13 | t-BuOH | 168 | None | | | 33.8 | 29.3 | 9.90 | 15.1 |
| 14 | t-BuOH | 168 | ⋯do⋯ | | | 29.3 | 24.3 | 7.12 | 10.9 |
| 15 | t-BuOH | 168 | ⋯do⋯ | | | 28.5 | 17.7 | 5.04 | 7.7 |
| 16 | t-BuOH | 168 | ⋯do⋯ | | | 32.7 | 27.8 | 9.1 | 13.9 |
| 17 | MeOH | 168 | ⋯do⋯ | | | 26.2 | 1.5 | 0.393 | 0.603 |
| 18 | MeOH | 142.8 | Me Et Ketone | 25.2 | 15 | 28.5 | 15.6 | 4.45 | 6.82 |
| 19 | n-PrOH | 168 | None | | | 61.1 | 78.4 | 47.8 | 73.2 |
| 20 | n-PrOH | 142.8 | Me Et Ketone | 25.2 | 15 | 70.7 | 87.9 | 62.1 | 95.2 |

[1] Cyclohexanone.

The results presented in the above table clearly illustrate the effectiveness of the ketone promoters to substantially increase production of alkyl sulfonate from the reaction of an alkene and a bisulfite compound.

EXAMPLE II

A further series of runs was conducted by the method of Example I, using tert-butyl alcohol as the polar organic solvent and methyl ethyl ketone as the ketone promoter. In these runs, the volume percent of ketone promoter in the promoter-polar organic solvent mixture was varied from 10 to 40 percent in 10 volume percent increments. The results of these runs expressed below in Table II illustrate that high yields of sodium dodecyl sulfonate are obtainable when using varying amounts of ketone promoter.

TABLE II

| Run No. | Vol. Percent Methyl Ethyl Ketone in Ketone-tert-Butyl Alcohol Mixture | Yield of Sodium Dodecyl Sulfonate, Percent by Wt. as Determined by Methylene Blue Method |
|---|---|---|
| 21 | 10 | 88.8 |
| 22 | 20 | 95.1 |
| 23 | 30 | 91.3 |
| 24 | 40 | 71.4 |

EXAMPLE III

Two runs were conducted in which sodium bisulfite was reacted with 1-dodecene in the presence of water and tert-butyl alcohol. In the control run (25), and in the run (26) where methyl ethyl ketone was employed as the promoter, 40.4 grams (0.24 mol) of 1-dodecene, 31.2 grams (0.3 mol) of sodium bisulfite, 170 milliliters of water and 170 milliliters of tert-butyl alcohol were charged to a 500 milliliter reaction flask positioned in a 2 liter beaker containing flowing tap water. The flask was equipped with a stirrer. In Run 26, 27.4 grams (34 milliliters) of methyl ethyl ketone was introduced into the reaction mixture. In each run, the reaction mixture was illuminated by a General Electric RSP 2500-watt photospot shining through the water bath. The radiation and stirring of the reaction mixture was conducted for a period of six hours during which time the reaction mixture was maintained at a temperature of 30° C. At the end of this period, the reaction mixture was withdrawn from the re-

TABLE III

Yield of Dodecyl Sulfonate,
Run No.: Percent of Theoretical
25 _____ 22.1
26 _____ 87.1

The above results clearly indicate the effectiveness of the ketone promoter to significantly increase the yield of dodecyl sulfonate initiated by visible light radiant energy.

EXAMPLE IV

Two runs were carried out in which sodium bisulfite was allowed to react with cyclohexene in the presence of a mixed solvent system comprising tert-butyl alcohol and water and in the presence of ultraviolet radiation. In one run 18.7 grams (0.24 mol) of cyclohexene, 31.2 grams (0.3 mol) of sodium bisulfite, 170 milliliters of tert-butyl alcohol, and 170 milliliters of water were used. In the other run 19.7 grams (0.24 mol) of cyclohexene, 31.2 grams (0.3 mol) of sodium bisulfite, 136 milliliters of tert-butyl alcohol, and 170 milliliters of water were used, together with 34 milliliters of methyl ethyl ketone as a promoter. Each run was carried out at 33° C. for 4.5 hours in a Rayonet photochemical reactor utilizing 16 ultraviolet lamps emitting light at 2537 angstroms. The yield of sodium cyclohexane sulfonate from the run in which no ketone promoter was used was only 26.4 mol percent, whereas the yield of sodium cyclohexane sulfonate from the run employing methyl ethyl ketone was 99.2 mol percent. Thus, the methyl ethyl ketone clearly functioned as a promoter in the addition of sodium bisulfite to cyclohexene in the presence of ultraviolet light.

EXAMPLE V

Two runs were carried out in which sodium bisulfite was allowed to react with cyclohexene in the presence of a mixed solvent system comprising tert-butyl alcohol and water and in the presence of visible light. In one run 19.7 grams (0.24 mol) of cyclohexene, 31.2 grams (0.3 mol) of sodium bisulfite, 170 milliliters of tert-butyl alcohol, and 170 milliliters of water were used. In the other run 19.7 grams (0.24 mol) of cyclohexene, 31.2 grams (0.3 mol) of sodium bisulfite, 136 milliliters of tert-butyl alcohol, and 170 milliliters of water were used, together with 34 milliliters of methyl ethyl ketone as a promoter. Each run was carried out at 33° C. and 4.5 hours in a Rayonet photochemical reactor utilizing 16 daylight fluorescent lamps. The yield of sodium cyclohexane sulfonate from the run in which no ketone promoter was used was only 42.0 mol percent, whereas the yield of sodium cyclohexane sulfonate from the run employing methyl ethyl ketone was 79.5 mol percent. Thus, the methyl ethyl ketone clearly functioned as a promoter in the addition of sodium bisulfite to cyclohexene in the presence of visible light.

As will be evident to those skilled in the art, various modifications of this invention can be made, or followed, in the light of the foregoing disclosure, without departing from the spirit or scope thereof.

We claim:

1. A process for the production of a hydrocarbylsulfonate which comprises reacting in a reaction zone an alkene with a bisulfite of the formula $MHSO_3$, wherein M is selected from the group consisting of sodium, potassium, lithium, rubidium and cesium, said reacting conducted in the presence of electromagnetic radiant energy having a wave length in the range of 1,000 to 9,000 angstroms, a ketone promoter, and in the presence of a mixed solvent system comprising water and a polar organic solvent having a relatively low absorptivity for the electromagnetic radiant energy employed.

2. The process of claim 1 wherein the reaction temperature is maintained in the range from about the freezing point of the reaction mixture to about 50° C.

3. The process of claim 1 wherein the concentration of said bisulfite in said reaction zone will range from about 1 to 1.5 mols per mol of alkene feed to said reaction zone, the concentration of water present in the reaction zone will range from about 0.5 to about 10 grams of water per gram of the bisulfite present, the volume ratio of said polar organic solvent to said water in said reaction zone will range from about 0.1:1 to 2:1, the reaction temperature is in the range of about the freezing point of the reaction mxiture to about 100° C., said electromagnetic radiation will have a wave length in the range from about 1,000 to 9,000 angstroms, and the concentration of said ketone promoter in said reaction zone will range from about 7.5 to about 50 volume percent of a ketone promoter-polar organic solvent mixture in said reaction zone.

4. The process of claim 3 wherein said bisulfite is sodium bisulfite.

5. The process of claim 4 wherein said polar organic solvent is selected from the group consisting of tert-butyl alcohol and n-propyl alcohol.

6. A process according to claim 1 for the production of a hydrocarbylsulfonate which comprises reacting in a reaction zone an alkene with a bisulfite of the formula $MHSO_3$, wherein M is selected from the group consisting of sodium, potassium, lithium, rubidium and cesium, said reacting conducted in the presence of ultraviolet light, a ketone promoter, and in the presence of a mixed solvent system comprising water and a polar organic solvent having a relatively low absorptivity for said ultraviolet light.

7. A process according to claim 6 wherein said bisulfite is sodium bisulfite and said polar organic solvent is an alcohol.

8. A process according to claim 7 wherein said ketone is methyl ethyl ketone and said alcohol is tert-butyl alcohol.

9. A process according to claim 6 wherein said alkene is dodecene, said ketone is methyl ethyl ketone, said sulfite is sodium bisulfite, and said polar organic solvent is tert-butyl alcohol.

10. A process according to claim 6 wherein said alkene is cyclohexene, said ketone is methyl ethyl ketone, said sulfite is sodium sulfite, and said polar organic solvent is tert-butyl alcohol.

References Cited

UNITED STATES PATENTS 2,398,426  4/1946  Hanford _____ 204—162
3,048,531  8/1962  Stogryn et al. _____ 204—162

HOWARD S. WILLIAMS, *Primary Examiner.*